US008874783B1

(12) United States Patent
Masters

(10) Patent No.: US 8,874,783 B1
(45) Date of Patent: *Oct. 28, 2014

(54) METHOD AND SYSTEM FOR FORWARDING MESSAGES RECEIVED AT A TRAFFIC MANAGER

(75) Inventor: Richard Roderick Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 118 days.

This patent is subject to a terminal disclaimer.

(21) Appl. No.: 12/327,742

(22) Filed: Dec. 3, 2008

Related U.S. Application Data

(63) Continuation of application No. 10/172,411, filed on Jun. 13, 2002, now Pat. No. 7,490,162.

(60) Provisional application No. 60/381,028, filed on May 15, 2002.

(51) Int. Cl.
　　*G06F 15/173* (2006.01)
　　*G06F 15/16* (2006.01)
　　*H04L 29/08* (2006.01)

(52) U.S. Cl.
　　CPC ........ *H04L 67/1006* (2013.01); *H04L 67/1027* (2013.01)
　　USPC ............................ 709/238; 709/227; 709/228

(58) Field of Classification Search
　　CPC . H04L 67/1006; H04L 67/1027; H04L 67/14; H04L 67/141; H04L 67/142
　　USPC ........... 709/203, 219, 227–229, 238; 370/349
　　See application file for complete search history.

(56) References Cited

U.S. PATENT DOCUMENTS

| 5,553,242 | A  |   | 9/1996  | Russell et al.            |
|-----------|----|---|---------|---------------------------|
| 5,774,660 | A  | * | 6/1998  | Brendel et al. ... 709/201 |
| 5,835,724 | A  |   | 11/1998 | Smith                     |
| 5,941,988 | A  |   | 8/1999  | Bhagwat et al.            |
| 6,104,716 | A  | * | 8/2000  | Crichton et al. ... 370/401 |
| 6,128,657 | A  | * | 10/2000 | Okanoya et al. ... 709/224 |
| 6,175,867 | B1 | * | 1/2001  | Taghadoss ... 709/223     |
| 6,182,122 | B1 | * | 1/2001  | Berstis ... 709/217       |
| 6,226,684 | B1 | * | 5/2001  | Sung et al. ... 709/238   |
| 6,253,226 | B1 |   | 6/2001  | Chidambaran et al.        |

(Continued)

OTHER PUBLICATIONS

Heon Y. yeom et al., 'IP multiplexing by transparent port-address translator', Proceedings of the tenth USENIX System Administration Conference, Chicago, IL, USA, 1996, pp. 1-16.*

(Continued)

*Primary Examiner* — Catherine Thiaw
(74) *Attorney, Agent, or Firm* — John W. Branch; Lowe Graham Jones PLLC

(57) ABSTRACT

A method and system for forwarding messages received at a traffic manager. A traffic manager receives a message from a first connection to a client computer. At least a part of the message is to be forwarded to a server. If a connection exists to the server that matches the first connection, at least a part of the message is forwarded to the server by employing the existing connection. Otherwise, a source address is selected with which to communicate with the server. A new connection that includes the source address and a destination address associated with the server is opened. In addition, information associating the source address and the destination address with the first connection is stored. This information may then be used to map a response received from the server to the first connection.

20 Claims, 10 Drawing Sheets

(56) References Cited

U.S. PATENT DOCUMENTS

| | | | |
|---|---|---|---|
| 6,298,380 B1 | 10/2001 | Coile et al. | |
| 6,304,908 B1* | 10/2001 | Kalajan | 709/229 |
| 6,321,250 B1* | 11/2001 | Knape et al. | 709/203 |
| 6,360,262 B1* | 3/2002 | Guenthner et al. | 709/226 |
| 6,370,584 B1 | 4/2002 | Bestavros et al. | |
| 6,381,638 B1* | 4/2002 | Mahler et al. | 709/220 |
| 6,411,986 B1 | 6/2002 | Susai et al. | |
| 6,549,538 B1* | 4/2003 | Beck et al. | 370/395.52 |
| 6,611,873 B1* | 8/2003 | Kanehara | 709/238 |
| 6,650,640 B1 | 11/2003 | Muller et al. | |
| 6,654,701 B2 | 11/2003 | Hatley | |
| 6,697,363 B1 | 2/2004 | Carr | |
| 6,725,213 B1* | 4/2004 | Chiocca et al. | 1/1 |
| 6,754,662 B1 | 6/2004 | Li | |
| 6,766,373 B1 | 7/2004 | Beadle et al. | |
| 6,829,238 B2 | 12/2004 | Tokuyo et al. | |
| 6,928,082 B2 | 8/2005 | Liu et al. | |
| 6,947,992 B1* | 9/2005 | Shachor | 709/228 |
| 6,950,434 B1 | 9/2005 | Viswanath et al. | |
| 6,954,780 B2 | 10/2005 | Susai et al. | |
| 6,957,272 B2 | 10/2005 | Tallegas et al. | |
| RE38,902 E* | 11/2005 | Srisuresh et al. | 709/245 |
| 6,963,982 B1* | 11/2005 | Brustoloni et al. | 726/15 |
| 6,978,334 B2 | 12/2005 | Hiratsuka | |
| 7,007,092 B2 | 2/2006 | Peiffer | |
| 7,103,045 B2 | 9/2006 | Lavigne et al. | |
| 7,136,385 B2* | 11/2006 | Damon et al. | 370/395.31 |
| 7,139,792 B1 | 11/2006 | Mishra et al. | |
| 7,146,417 B1* | 12/2006 | Coile et al. | 709/224 |
| 7,161,947 B1* | 1/2007 | Desai | 370/401 |
| 7,215,637 B1 | 5/2007 | Ferguson et al. | |
| 7,225,237 B1* | 5/2007 | Tenereillo | 709/219 |
| 7,231,446 B2* | 6/2007 | Peiffer et al. | 709/226 |
| 7,254,639 B1 | 8/2007 | Siegel et al. | |
| 7,277,924 B1* | 10/2007 | Wichmann et al. | 709/217 |
| 7,321,926 B1 | 1/2008 | Zhang et al. | |
| 7,366,781 B2 | 4/2008 | Abjanic | |
| 7,376,731 B2 | 5/2008 | Khan et al. | |
| 7,548,962 B2* | 6/2009 | Weber et al. | 709/219 |
| 7,657,618 B1 | 2/2010 | Rothstein et al. | |
| 7,720,980 B1 | 5/2010 | Hankins et al. | |
| 7,774,484 B1 | 8/2010 | Masters et al. | |
| 8,009,566 B2 | 8/2011 | Zuk et al. | |
| 8,645,556 B1* | 2/2014 | Masters | 709/230 |
| 2001/0023442 A1* | 9/2001 | Masters | 709/227 |
| 2002/0025036 A1 | 2/2002 | Sato | |
| 2002/0055980 A1* | 5/2002 | Goddard | 709/217 |
| 2002/0055983 A1* | 5/2002 | Goddard | 709/217 |
| 2002/0059428 A1 | 5/2002 | Susai et al. | |
| 2002/0062372 A1* | 5/2002 | Hong et al. | 709/225 |
| 2002/0078174 A1* | 6/2002 | Sim et al. | 709/219 |
| 2002/0105931 A1* | 8/2002 | Heinonen et al. | 370/338 |
| 2002/0112071 A1* | 8/2002 | Kim | 709/238 |
| 2002/0120743 A1* | 8/2002 | Shabtay et al. | 709/226 |
| 2002/0138627 A1* | 9/2002 | Frantzen et al. | 709/227 |
| 2002/0138739 A1 | 9/2002 | Scheetz et al. | |
| 2002/0143965 A1* | 10/2002 | Aiken, Jr. | 709/229 |
| 2003/0053448 A1* | 3/2003 | Craig et al. | 370/353 |
| 2003/0091025 A1* | 5/2003 | Celi et al. | 370/352 |
| 2003/0145077 A1 | 7/2003 | Khan et al. | |
| 2003/0208600 A1* | 11/2003 | Cousins | 709/227 |
| 2004/0205597 A1 | 10/2004 | Abjanic | |
| 2004/0225810 A1 | 11/2004 | Hiratsuka | |
| 2005/0138243 A1 | 6/2005 | Tierney et al. | |
| 2008/0253366 A1 | 10/2008 | Zuk et al. | |
| 2010/0121953 A1 | 5/2010 | Friedman et al. | |

OTHER PUBLICATIONS

Acharya et al., "Scalable Web Request Routing with MPLS," IBM Research Report, IBM Research Division, Dec. 5, 2001.

Official Communication for U.S. Appl. No. 10/385,790 mailed Apr. 8, 2008.

Official Communication for U.S. Appl. No. 10/385,790 mailed Sep. 2, 2008.

Official Communication for U.S.. Appl. No. 10/385,790 mailed Mar. 4, 2009.

Official Communication for U.S. Appl. No. 10/385,790 mailed Sep. 10, 2009.

U.S. Appl. No. 10/172,411; Official Communication mailed Apr. 30, 2007.

U.S. Appl. No. 10/172,411; Official Communication mailed Nov. 13, 2006.

U.S. Appl. No. 10/172,411; Official Communication mailed Sep. 1, 2006.

U.S. Appl. No. 10/172,411; Official Communication mailed Jun. 19, 2006.

U.S. Appl. No. 10/172,411; Official Communication mailed Dec. 16, 2005.

Reardon, Marguerite, "A Smarter Session Switch: Arrowpoint's CS Session Switches Boast the Brains Needed for E-Commerce," Data Communications, Jan. 1999, title page, pp. 3, 5, 18.

Hewitt, John R. et al., "Securities Practice and Electronic Technology," Corporate Securities Series, (New York: Law Journal Seminars-Press) 1998, title page, bibliography page, pp. 4.29-4.30.

Hochmuth, Phill, F5, CacheFlow pump up content-delivery lines, May 4, 2001, Network World.

Fielding et al., "Hypertext Transfer Protocal," RFC 2068 Standards Track, Jan. 1997, pp. 1-162.

Fielding et al., "Hypertext Transfer Protocol," RFC 2616 Standards Track, Jun. 1999, pp. 1-176.

"Big-IP Controller With Exclusive OneConnect Content Switching Feature Provides a Breakthrough System for Maximizing Server and Network Performance," F5 Networks, Inc., Press Release, May 8, 2001, pp. 1-3.

U.S. Appl. No. 10/409,951; Non-Final Office Action, mailed Jun. 22, 2010.

Snoeren, A.C., Andersen, D.G., and Balakrishnan, H. Fine-Grained Failover Using Connection Migration, in Third Annual USENIX Symposium on Internet Technologies and Systems, 2001. [retrieved from Internet = http://walfredo.dsc.ufcg.edu.br/cursos/apdist20011/Snoeren01.pdf on Jun. 18, 2010].

U.S. Appl. No. 10/409,951 Final Office Action, mailed Jul. 17, 2008, 28 pages.

U.S. Appl. No. 10/409,951 Non-Final Office Action, mailed Dec. 24, 2008, 25 pages.

U.S. Appl. No. 10/409,951 Final Office Action, mailed Jun. 10, 2009, 22 pages.

U.S. Appl. No. 10/409,951 Non-Final Office Action, mailed Dec. 24, 2009, 25 pages.

Mogul, J. C., "The Case for Persistent-Connection HTTP," Proceedings of the Conference on Applications, Technologies, Architectures, and Protocols for Computer Communication, p. 299-313, Aug. 28-Sep. 1, 1995, Cambridge, Massachusetts.

U.S. Appl. No. 10/172,411 Non-Final Office Action, mailed Oct. 18, 2007, 21 pages.

U.S. Appl. No. 10/172,411 Final Office Action, mailed Apr. 25, 2008, 24 pages.

U.S. Appl. No. 10/172,411 Notice of Allowance, mailed Oct. 1, 2008, 17 pages.

U.S. Appl. No. 10/409,951 Non-Final Office Action, mailed Jun. 16, 2006, 16 pages.

U.S. Appl. No. 10/409,951 Final Office Action, mailed Nov. 30, 2006, 17 pages.

U.S. Appl. No. 10/409,951 Non-Final Office Action, mailed Mar. 8, 2007, 18 pages.

U.S. Appl. No. 10/409,951 Final Office Action, mailed Aug. 24, 2007, 22 pages.

U.S. Appl. No. 10/409,951 Non-Final Office Action, mailed Jan. 4, 2008, 24 pages.

Official Communications for U.S. Appl. No. 13/445,843 mailed Jun. 4, 2012.

Official Communication for U.S. Appl. No. 13/445,843 mailed Sep. 5, 2012.

Official Communication for U.S. Appl. No. 13/445,843 mailed Dec. 10, 2012.

Official Communication for U.S. Appl. No. 13/445,843 mailed Feb. 20, 2013.

(56) References Cited

OTHER PUBLICATIONS

Official Communication for U.S. Appl. No. 13/445,843 mailed May 17, 2013.
Official Communication for U.S. Appl. No. 10/385,790 mailed Apr. 2, 2010.
Official Communication for U.S. Appl. No. 10/409,951 mailed Jan. 19, 2011.
Official Communication for U.S. Appl. No. 12/837,420 mailed Mar. 2, 2011.
Official Communication for U.S. Appl. No. 12/837,420 mailed Aug. 18, 2011.
Official Communication for U.S. Appl. No. 12/837,420 mailed Nov. 25, 2011.
Official Communication for U.S. Appl. No. 13/300,398 mailed Jan. 12, 2012.

* cited by examiner

*FIG. 11*

| Mapping Of Traffic Manager Internal IP Address And Port # To Server And Port # | Mapping Of Client IP Address And Port # To Server And Port # |
|---|---|
| NAT 1:1024 --> SERVER1:80 | CLIENT 1:5093 --> SERVER 1:80 |
| NAT 1:1024 --> SERVER2:80 | CLIENT 2:8437 --> SERVER 1:80 | ial
METHOD AND SYSTEM FOR FORWARDING MESSAGES RECEIVED AT A TRAFFIC MANAGER

CROSS-REFERENCE TO RELATED APPLICATION

This utility patent application is a continuation of U.S. patent application Ser. No. 10/172,411 filed on Jun. 13, 2002 entitled "Method And System For Forwarding Messages Received At A Traffic Manager," which in turn is based on U.S. Provisional Patent application Ser. No. 60/381,028 filed on May 15, 2002, the benefit of the filing dates of which are hereby claimed under 35 U.S.C. §§119(e) and 120, and which are each further incorporated herein by reference in their entirety.

FIELD OF THE INVENTION

This application relates generally to networks, and, more specifically, to traffic management in networks.

BACKGROUND

The Internet's core bandwidth continues to increase every year. Some of this additional bandwidth is consumed as more and more users access the Internet. Other additional bandwidth is consumed as existing users increase their use of the Internet. This increase of Internet use translates into an increase in traffic directed to and from World Wide Web (WWW) servers and other servers connected to the Internet.

In a typical Web session between a client and a server, each time the user clicks the mouse to visit a Web site, several processes are initiated. The server opens a socket, allocates memory for the user, acknowledges the user's Hypertext Transport Protocol (HTTP) request, fetches the data from disk memory, returns the data, and closes the session. The entire process is initiated again with the next mouse click.

A typical Web page includes multiple objects. In the past, for each object requested, a separate TCP connection (a bi-directional byte stream or roadway) was created and torn down. This caused both overhead and latency in responding to requests. It caused overhead, in part, because for each object requested, a server would have to create, maintain, and tear down a connection. It caused latency, in part, because creating and tearing down connections require multiple packets to be sent between devices that may be around the globe from each other.

HTTP version 1.1 includes a feature called session keep-alives, or just keep-alives. The HTTP version 1.1 keep-alive protocol partially addresses latency, bandwidth, and server/network problems by consolidating and maintaining a single TCP connection for HTTP traffic between the user and the Web system—regardless of the number and type of requests being made. In essence, a client computer opens an HTTP connection to a server and sends requests along this connection. The server sends responses in the opposite direction. HTTP version 1.1 may work adequately when only one client and one server are involved. When many clients are involved, however, responding to requests in a timely manner often requires more resources than a server has.

Replacing a server with a server of twice the capacity is a costly undertaking. Adding additional servers to form a group of servers servicing requests is less costly but generally requires a traffic management device (hereinafter "traffic manager") to distribute traffic. The traffic manager may be configured to distribute traffic to each server so that multiple servers can service requests. Distributing traffic to more than one server, however, has its own problems as will be illustrated below.

In addition, with a sufficient amount of traffic between client computers and servers managed by a traffic manager, the traffic manager may run out of resources to map client requests to servers.

SUMMARY

In accordance with the present invention, there is provided a method and system for forwarding messages received at a traffic manager. A traffic manager receives a message from a first connection on a client computer. At least a part of the message is to be forwarded to a server. If a connection exists to the server that matches the first connection from the client computer, at least a part of the message is forwarded to the server by employing the existing connection. Otherwise, a source address is selected with which to communicate with the server. A new connection that includes the source address and a destination address associated with the server is opened. In addition, information associating the source address and the destination address with the first connection is stored. This information may then be used to map a response received from the server to the first connection.

In one aspect of the invention, a hypertext transport protocol (HTTP) header is inserted into the part of the message forwarded to the server. The HTTP header includes an identification of the client. The identification of the client may include at least one of a source address and a port number of the first connection from the client computer.

In another aspect of the invention, a connection from a traffic manager to a server may match one or more connections from clients. For example, a traffic manager may use one source address to connect to multiple servers on behalf of multiple connections from clients. A connection from a traffic manager to a server may match a connection from a client if an address is found in a table or other data structure that associates at least the connection from the client with the connection to the server. The address may be, for example, a source address of a connection. An existing connection to a server may match only one connection from the client, an existing connection to a server may match more than one connection from a single client, or an existing connection may match a set of connections from a set of clients. Each connection from the traffic manager to a server may match one or more connections from clients independently of the matching for another connection from the traffic manager to the server.

In another aspect of the invention, the traffic manager may examine contents of a message received from a client to select a server pool. The server pool includes the server mentioned above.

In another aspect of the invention, the message is encoded with version 1.1 or greater of the hypertext transport protocol (HTTP).

In another aspect of the invention, the message includes a request for content associated with another server. This request is forwarded to the other server by employing a third connection that is associated (and can map responses back to) the first connection.

In another aspect of the invention, the source and destination addresses may include an IP address and a port number. A source address may be an address at which a traffic manager is accessible on a network attached to the server. A source address/destination address pair may map uniquely to a single connection between the traffic manager and a client. In other words, the IP address and the port number may not be used to communicate with the server in another connection from the traffic manager that includes the destination address. The source and destination addresses may be stored in a table that associates a combination of the source and destination addresses with a connection to the client.

In one aspect of the invention, opening a connection to the traffic manager includes activating a connection that has been unused for a period of time. In another aspect of the invention, opening a connection to the traffic manager includes sending a handshaking packet to the server.

In one aspect of the invention, a message is received from the server. The message is response to a previous request sent to the server. The traffic manager employs the source address and the destination address of the received message to retrieve information identifying the first connection. It then sends a least a part of the received message through the first connection.

In another aspect of the invention, an apparatus includes a first interface arranged to communicate with a client and a second interface arranged to communicate with a server. The apparatus also includes circuitry coupled to the interfaces. If a connection to the server is not matched to the connection from the client, the circuitry performs actions, including selecting a source address with which to communicate with the server, opening a connection to the server, and storing information associating the new connection with the first connection. The apparatus may be perform further actions of sending at least part of the message to the server, receiving a message responsive to the message, employing the source and destination addresses of the responsive message to identify the first connection, and send at least a part of the responsive message through the first connection.

In another aspect of the invention, means for communicating with a least one client (such as a network interface, bus interface, USB port, and other input/output mechanisms described below), means for communicating with a plurality of servers (including the same types of means that can be used for the communicating with the client and other input/output mechanisms described below), and means for mapping messages between the client and the plurality of servers (such as a programmed processor and other mechanisms described below) are described.

Aspects of the invention may be embodied in software and/or hardware and on a computer-readable medium and/or in a modulated data signal.

These and various other features as well as advantages, which characterize the present invention, will be apparent from a reading of the following detailed description and a review of the associated drawings.

BRIEF DESCRIPTION OF THE DRAWINGS

FIG. 11 shows a mapping table that associates traffic manager internal IP addresses and port numbers with server IP addresses and port number, according to an embodiment of the invention.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first an illustrative operating environment in which the invention may be practiced is disclosed. Then, an illustrative arrangement and interaction of elements using within an operating environment are described. Next, exemplary communications between a client and a single server using pre- and post-HTTP version 1.1 protocols are shown. Next, an environment in which a traffic manager is configured to perform load balancing functions to balance requests among multiple servers is shown. Finally, exemplary methods employed by the elements to enable a traffic manager to use a port to communicate with one or more servers on behalf of multiple client connections are disclosed.

Illustrative Operating Environment

Figure 1:
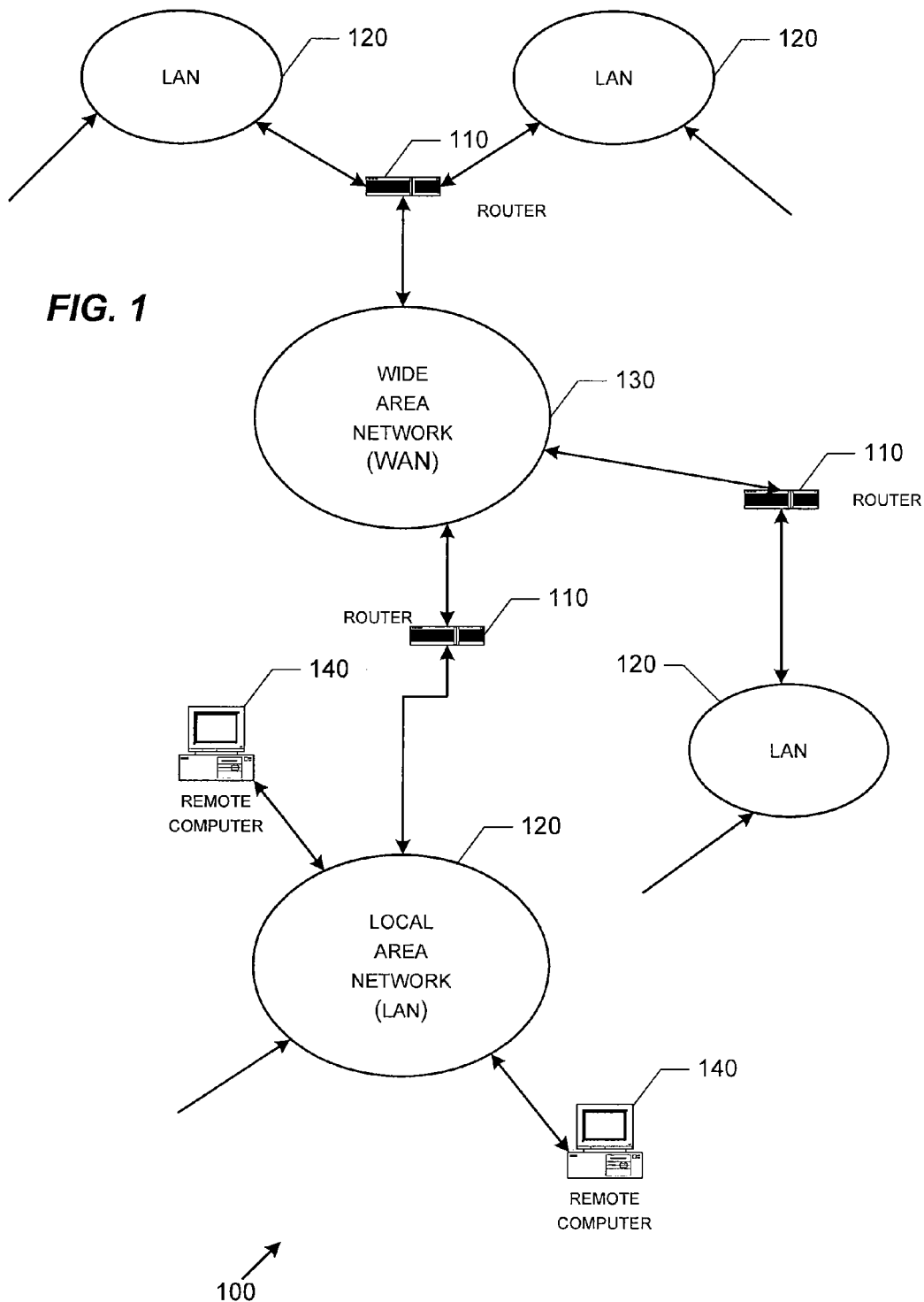
FIGS. 1-3 show components of an exemplary environment in which the invention may be practiced.
Figure 2:
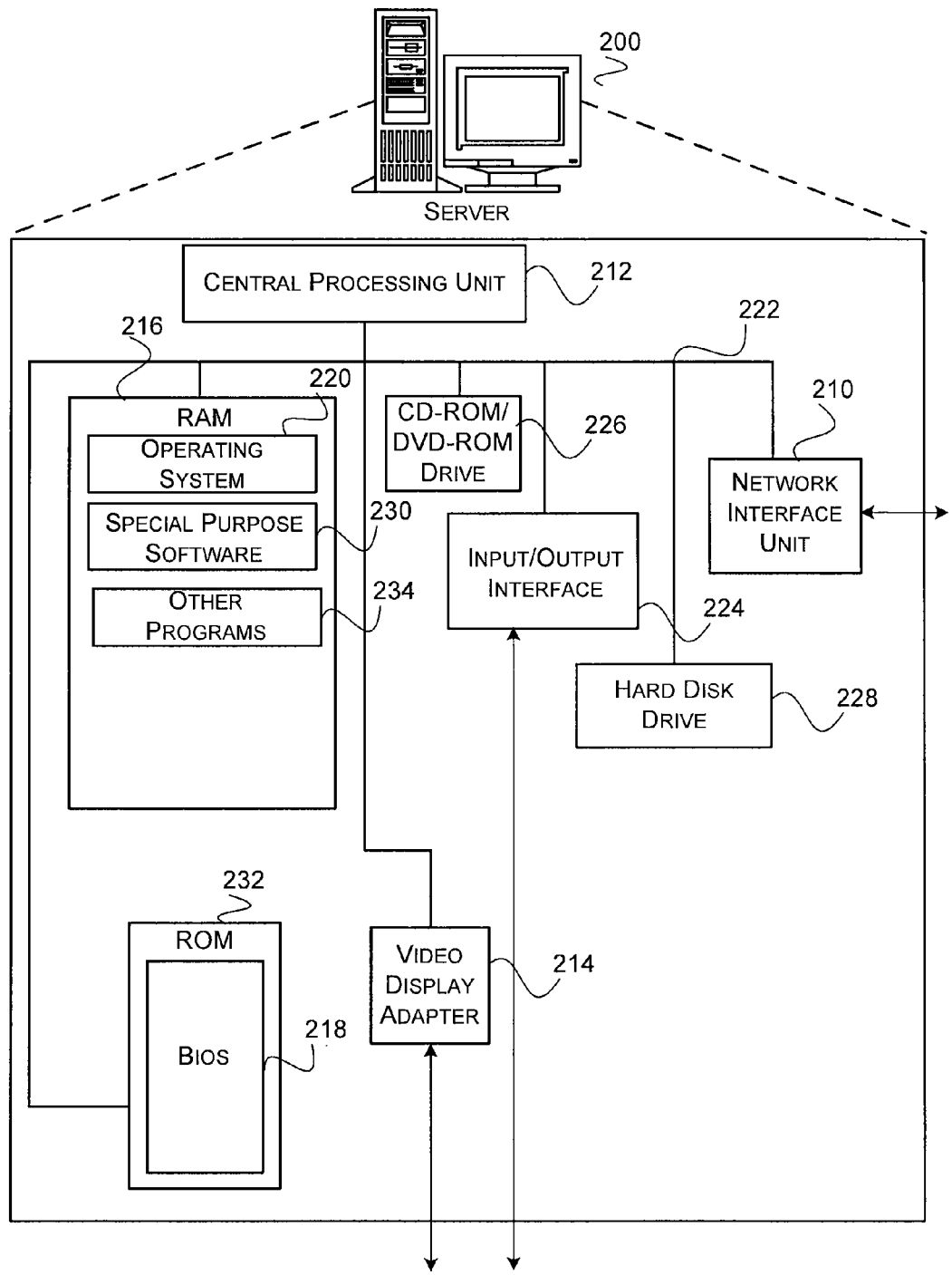
Figure 3:
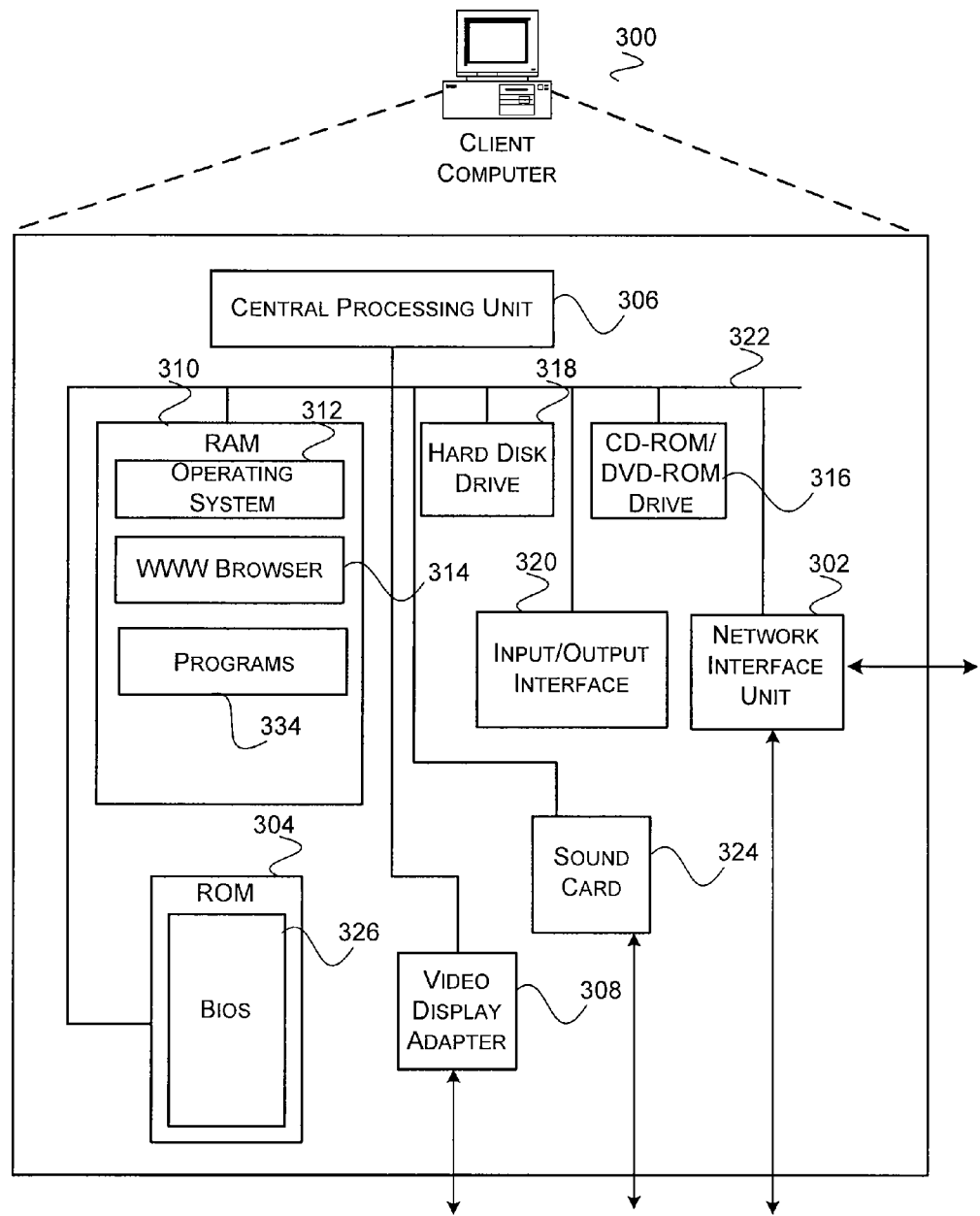

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/ Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from a File Transfer Protocol (FTP) site and send messages to other users via email by using links on the Web page.

A server providing a WWW site, as the server described in more detail in conjunction with FIG. 2 may, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. A WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, among other things. Such a device may be used, for example, as a workstation, network appliance, router, bridge, firewall, gateway, traffic management device, and/or other server. When used to provide a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

It will be appreciated that server 200 may include more or fewer components than those shown in FIG. 2. However, the components shown are sufficient to disclose an illustrative environment for practicing the present invention. As shown in FIG. 2, server 200 may be connected to WAN/LAN 100, or other communications network, via network interface unit 210. Network interface unit 210 includes the necessary circuitry for connecting server 200 to WAN/LAN 100, and is constructed for use with various communication protocols including the TCP/IP protocol. Network interface unit 210 may include or interface with circuitry and components for transmitting messages and data over a wired and/or wireless communications medium. Typically, network interface unit 210 is a card contained within server 200.

Server 200 may also include processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose operating system including, for example, UNIX, LINUX™, or one produced by Microsoft Corporation of Redmond, Wash. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including special purpose software 230, and other programs 234. Special purpose software 230 may include a WWW server application program that includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 may also comprise input/output interface 224 for communicating with external devices, such as a mouse, keyboard, scanner, or other input devices not shown in FIG. 2. In some embodiments of the invention, computing device does not include user input/output components. For example, server 200 may or may not be connected to a monitor. In addition, server 200 may or may not have video display adapter 214 or input/output interface 224. For example server 200 may implement a network appliance, such as a router, gateway, traffic management device, etc., that is connected to a network and that does not need to be directly connected to user input/output devices. Such a device may be accessible, for example, over a network.

Server 200 may be implemented as a blade server. A blade is a card inserted into a hardware chassis. A blade may include, for example, one or more processors, volatile and non-volatile memory, interfaces suitable for transferring information to and from the blade, and other components known to those skilled in the art. For example, a blade may include a specialized interface for transferring information to a backplane and other interfaces, such as a USB port, serial port, RF interface, IR interface, and IDE controller for transferring information to other devices.

FIG. 3 depicts several components of client computer 300. Client computer 300 may include more or fewer components than those shown in FIG. 3. However, the components shown are sufficient to disclose an illustrative environment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304 and a permanent mass storage device, such as a disk drive. The memory stores operating system 312 and programs 334 for controlling the operation of client computer 300. The memory may also include WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200 configured as a traffic management device. For example, programming steps may be contained in special purpose software 230.

Illustrative Arrangement and Interaction of Elements

Figure 4:
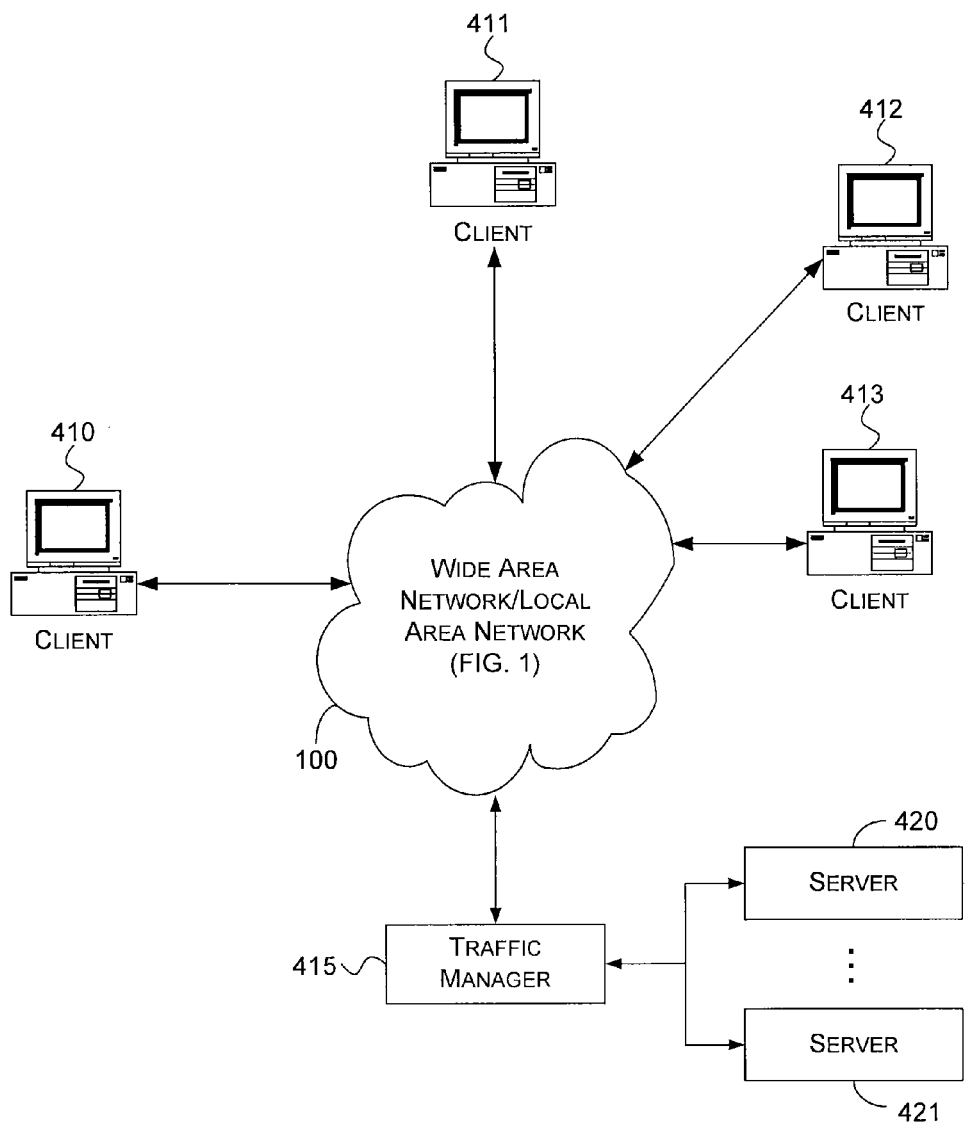
FIG. 4 illustrates an exemplary environment in which the invention operates.

FIG. 4 illustrates an exemplary environment in which the invention operates, according to one embodiment of the invention. The environment includes clients 410-413, WAN/LAN 100, traffic manager 415, and a server array. The server array includes servers 420 and 421. WAN/LAN 100 couples clients 410-413 to traffic manager 415. Traffic manager 415 couples the server array to WAN/LAN 100.

Clients 410-413 are any devices capable of connecting with WAN/LAN 100. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, clients 410-413 may be any devices that are capable of connecting using a wired or wireless communication medium such as a PDA, POCKET PC, wearable computer, or other devices mentioned above that are equipped to use a wired and/or wireless communications medium. An exemplary client that may connect with WAN/LAN 100 is client computer 300 of FIG. 3.

A client, such as one of clients 410-413, may sometimes act as a server. That is, a client is not constrained to be a device that always requests services; rather, it may also be a device that usually provides services to other clients.

WAN/LAN 100 is any network or group of networks that can connect clients 410-413 to traffic manager 415. WAN/LAN 100 is described in more detail in conjunction with FIG. 1. The Internet is an example of a network that may connect client 410-413 to traffic manager 415.

Traffic manager 415 receives packets from WAN/LAN 100 and from the server array. In some operations, traffic manager 415 may act like a layers 4-7 switch. That is, it may look at content associated with higher TCP/IP layers of the packet, e.g. a request for an HTML page such as www.favorites.com/newthings.html and information that identifies the user, such as a cookie, etc. It may store information in memory so that next time the requestor requests more information from www.favorites.com each request is sent to the same server. A traffic manager, such as traffic manager 415, may do this, in part, to ensure that the user is connected to the server that the user previously connected to. This helps prevent the loss of transaction data, such as items in a shopping cart.

In addition, traffic manager 415 may perform network address translation (NAT). That is, in a TCP/IP packet, it may change the source and/or destination field. This may be done for many reasons. One reason is so that intranets can keep their own private address space and not have to use publicly routable addresses, which may be difficult to obtain. Traffic manager 415 may maintain state information to gracefully close a connection if, for example, a server fails. In addition, traffic manager 415 may maintain state information to reroute a connection to another server if the server fails.

For example, if a server, such as server 420, requested stock information from a stock server (not shown) connected to WAN/LAN 100, the server would give its IP address as the source address so that the stock server would know where to respond to. Traffic manager 415 could replace the source IP address of the request with an IP address associated with traffic manager 415 so that the stock server would respond to traffic manager 415 instead of server 420. This allows traffic manager 415 to maintain state information, provide security, and gracefully shut down or transfer a connection between the stock server and server 420.

Establishing and shutting down TCP/IP connections generally causes a lot of overhead. For example, to set up a TCP/IP connection between two devices may require over three messages to be sent between the two devices. Shutting down the connection between the two devices may require two or more messages to be sent between the two devices.

When a client has established a connection, it may send several requests before closing the connection. For example, the client may request a WWW page, request an mp3 file, and then request a graphics image. A server array may be set up such that one server serves WWW pages, another server serves mp3 files, and another server serves images. A traffic manager that manages traffic between the client and the server array would ideally send each request to the appropriate server. Instead of opening a new connection to each server, a traffic manager may maintain a pool of connections with servers in the server array. When a client requests content, the traffic manager may use one of its previously opened connections to relay the request to an appropriate server.

A traffic manager may be configured to maintain at least one connection to each server for each active connection between the traffic manager and a client. Information regarding a connection including a client's IP address and port number, a server's IP address and port number, a number indicating the next sequence number to send to the server, a number indicating the next sequence number to send to the client, and buffers to hold data may be stored in a structure or object (hereinafter "connection object") on a computer storage medium associated with the traffic manager. This data may consume between 250 bytes and 500 bytes of memory or more per active connection. With a sufficient number of connections, a traffic manager may no longer have enough high speed memory to maintain state information for each active connection.

A traffic manager, such as traffic manager 415, is any device that manages network traffic. Such devices may include, for example, routers, proxies, firewalls, load balancers, devices that perform network address translation, any combination of the preceding devices, and the like. A traffic manager may, for example, control the flow of data packets delivered to and forwarded from an array of servers, such as servers 420-421. These servers may be used, for example, as Web servers. A traffic manager may direct a request for a resource to a particular Web server based on network traffic, network topology, capacity of the server, content requested, and a host of other traffic management metrics. A traffic manager may receive data packets from and transmit data packets to the Internet, an intranet, or a local area network accessible through another network. A traffic manager may recognize packets that are part of the same communication, flow, and/or stream and may perform special processing on such packets, such as directing them to the same server so that state information is maintained. A traffic manager may support a wide variety of network applications such as Web browsing, email, telephony, streaming multimedia, and other traffic that is sent in packets.

A traffic manager may be implemented using a one or more personal computers, POCKET PCs, blades, components of a blade, wearable computers, processors, multiprocessor systems, microprocessor-based or programmable consumer electronics, network PCs, cell phones, smart phones, pagers, walkie talkies, radio frequency (RF) devices, infrared (IR) devices, CBs, integrated systems or devices combining one or more of the preceding devices, and the like. For example, a traffic manager may be implemented as a single blade, as multiple blades, as a server that includes a blade and other components, or as a component of a blade. Components implementing a traffic manager may be implemented solely in hardware or in hardware and software. For example, such devices may include some application specific integrated circuits (ASICs) coupled to one or more microprocessors. The ASICs may be used to provide a high speed switch fabric while the microprocessors may perform higher layer processing of packets. An exemplary device that could be used as a traffic manager is server 200 of FIG. 2, configured with appropriate software. A traffic manager may have multiple network interface units and each network interface unit may interface with one or more networks.

Servers 420 and 421 generally include any devices capable of responding to a request from a requesting device, such as client computer 410. The set of such devices generally include the devices listed above in reference to a traffic manager. An exemplary device that could be used for server 420 and 421 is server 200 of FIG. 2, configured with appropriate software.

Figure 5:
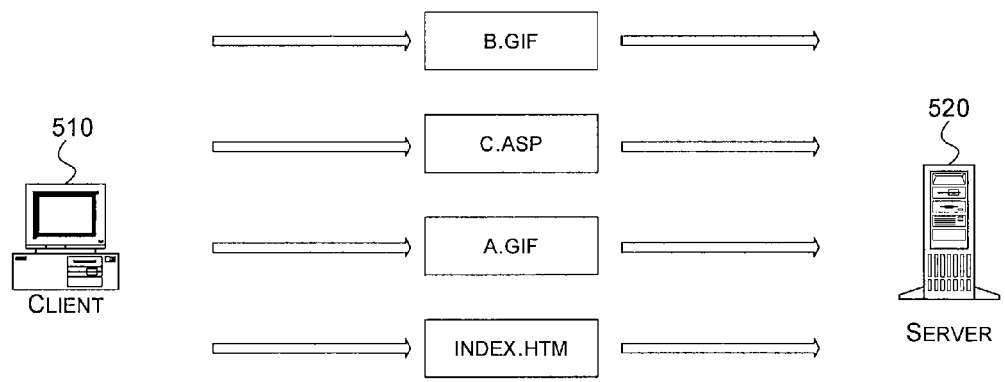
FIG. 5 illustrates an exemplary communication between a client and a single server using a pre-HTTP version 1.1 protocol.

FIG. 5 illustrates an exemplary communication between a client and a single server using a pre-HTTP version 1.1 protocol. In FIG. 5, client 510, is requesting a Web page that includes at least 4 objects, e.g. b.gif, c.asp, a.gif, and index.htm. The client is using a pre-HTTP version 1.1 protocol. Using this protocol, client 510 opens a separate TCP connection to request and receive each object. This adds overhead and latency in fulfilling client 510's request because each TCP session is set up and torn down for each type of request being made. A request for a GIF file represents one TCP connection, a request for ASP another, and so on. Many web pages include 15-20 objects or more. The more objects involved, the more set-up and tear-downs are required, and the longer the wait for users to get their information.

Figure 6:
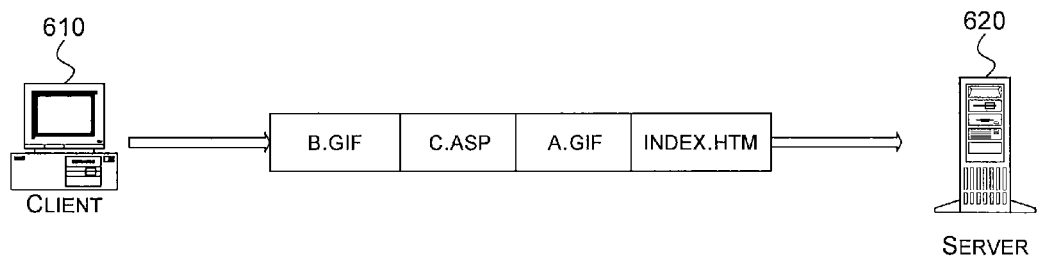
FIG. 6 illustrates an exemplary communication between a client and a single server using HTTP version 1.1.

FIG. 6 illustrates an exemplary communication between a client and a single server using HTTP version 1.1. In this example, a client is also requesting at least 4 objects, e.g. b.gif, c.asp, a.gif, and index.htm. Because the client is using HTTP version 1.1, the client may open a single connection to the server and send each request for an object through the connection. This avoids some of the overhead and latency of opening multiple connections under a pre-HTTP version 1.1 protocol, but this configuration is not very scalable. If one or more clients begin requesting a sufficient amount of content and/or services from server 620, server 620 may become overwhelmed and/or not respond in a timely manner.

Figure 7:
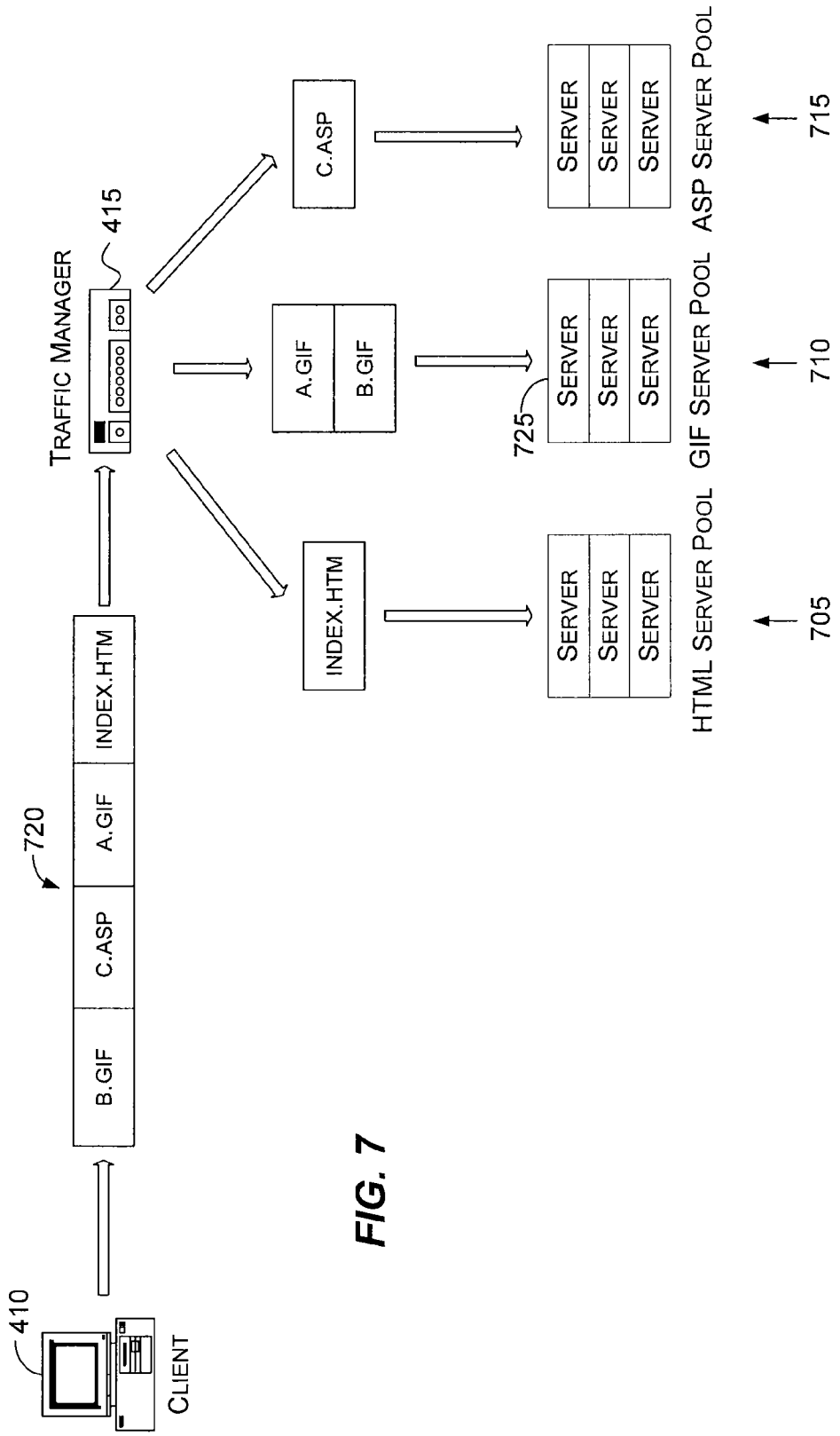
FIG. 7 illustrates an environment in which a traffic manager is configured to perform load balancing functions to balance requests among multiple servers.

FIG. 7 illustrates an environment in which a traffic manager is configured to perform load balancing functions to balance requests among multiple servers, according to one embodiment of the invention. The environment includes client 410, traffic manager 415, and server pools 705, 710, and 715. Server pool 710 includes server 725, among other servers. Client 410 is coupled to traffic manager 415 over a network (not shown) such as WAN/LAN 100 of FIGS. 1 and 4. Traffic manager 415 couples servers in server pools 705, 710, and 715 to the network (not shown).

It will be recognized that FIG. 7 illustrates an environment similar to that illustrated in FIG. 4. In FIG. 7, one pool of servers, i.e., server pool 705, provides static HTML content, another pool of servers, i.e., server pool 710, provides GIF encoded pictures, and yet another pool of servers, i.e., server pool 715, provides dynamic ASP content. A pool is a grouping of servers that includes one or more servers. A server can be in one or more pools. In some configurations, one or more servers may provide only one type of content. In some configurations, one or more servers may provide multiple types of content, but not all types. In some configurations, one or more servers may provide all types of content. Load balancing may include using one or more algorithms to distribute requests among the servers in order to spread the work among available servers and avoid having any server become overloaded with requests.

When a client, such as client 410, communicates with a traffic manager, such as traffic manager 415, using HTTP version 1.1, it establishes a connection with the traffic manager. After establishing the connection, the client typically expects to send its subsequent requests using the same connection. For example, client 410 may send requests for multiple objects 720 using the same connection. To effectively balance traffic and workload, however, a traffic manager may need to connect to three or more different servers to retrieve the content.

As illustrated in FIG. 7, traffic manager 415 may send each type of request in requests for multiple objects 720 to servers in different server pools. For example, a request for index.htm may be directed to a server in server pool 705. The requests for a.gif and b.gif may be directed to servers in server pool 710. The request for c.asp may be directed to a server in server pool 715.

In one embodiment of the invention, a traffic manager opens and tears down connections to servers in server pools as needed. In another embodiment of the invention, a traffic manager maintains TCP connections with multiple servers in server pools. The traffic manager may then use one or more of these connections as needed to send requests on behalf of one or more clients. This avoids overhead and latency in setting up and tearing down connections between the traffic manager and servers in the server pools.

This embodiment of the invention addresses, among other things, latency, bandwidth, and server/network problems by consolidating and maintaining a single TCP connection for HTTP traffic between a client computer and the Web system. That is, a user's computer may need only one TCP connection to a traffic manager to retrieve content located on multiple servers—regardless of the number and type of requests being made.

As a result of practicing this embodiment of the invention, the overhead on the client computer and servers may be reduced by reducing the number of TCP sessions (connections) that need to be opened and closed for each object being requested. The number of network round-trips needed for user/server interaction may also be reduced. Bandwidth costs are typically reduced because TCP connections over the network can be reduced. The capacity for other tasks of backend servers, such as servers in server pools 705, 710, and 715, may also be increased, in part because they do not need to continually open and tear down connections.

Some servers may not support maintaining a connection with a traffic manager as it relates to HTTP or other traffic. For example, a server may close a connection after sending a response to a request. In one embodiment of the invention, a traffic manager may recognize when a server does not support maintaining a connection. With respect to HTTP, for example, a traffic manager may monitor and/or inspect incoming and outgoing data. It may use logic to automatically send a request to a server that can handle the request and that is not overloaded. In one embodiment, the logic includes a set of rules for matching data to pools of servers. Each rule has an associated pool. The logic may apply each rule to the data in the request received. If the data fits the rule, the data can be matched to the associated pool of servers.

In some embodiments of the invention, for each client connection, a traffic manager may concurrently maintain persistent, managed connections to servers in multiple server pools using the HTTP 1.1 keep-alive protocol.

In some embodiments of the invention, the traffic manager may aggregate requests from different client computers that are bound for the same server while maintaining a single connection to each client computer—regardless of what content or application is requested. The traffic manager then groups like requests for multiple client computers and send them to appropriate servers. This may help to reduce overhead on the backend servers, increase capacity of the backend servers, and allow sites to handle more connections.

In an embodiment of the invention, the traffic manager reads detailed information in a request header (such as the type of content requested and the IP address of the sender) and uses that information to route the request to a server best able to fulfill it.

In an embodiment of the invention, the traffic manager uses one or more health monitors. Health monitors are a collection of predefined scripts for testing the health and availability of the servers and applications that comprise web systems. Health monitors can be used to check if a server is responding to Web, FTP, Lightweight Directory Access Protocol (LDAP), or other request, or to verify that an application (Web, database, credit card verification, etc.) is operating properly before traffic is sent to that server.

Enterprise Web systems can include many servers and devices responding to multiple users demanding different content and applications. In an embodiment of the present invention, a connection aggregation method is used with HTTP version 1.1 keep-alives in this environment. This embodiment of the invention allows the traffic manager to maintain a single TCP connection for each client connection, regardless of what content or application is being requested on backend servers, and regardless how that content is distributed across the backend servers. This embodiment of the invention reduces client latency, network bandwidth consumption, and boosts performance of sites, servers, and the network itself by not requiring a TCP connection to be opened and closed for every object that a client computer requests. In one embodiment, a traffic manager configured as a content manager/load balancing appliance, performs methods in a content switching environment to improve performance of the entire system.

Method for Mapping Client Requests to Servers

Some communication protocols such as TCP/IP allow a total of approximately 65,000 ($2^{16}$) port numbers. A traffic manager may be configured to perform network address translations (NAT) as described previously. This may be done, for example, for security reasons and so that intranets can keep their own private address space and not have to use publicly routable addresses, which may be difficult to obtain. Similarly, a traffic manager may also perform a port address translation (PAT). That is, a traffic manager may receive a packet from a client. The packet may include as a source port number a certain client port number such as 5050. The traffic manager may receive the packet on a destination port such as 80 or 8080. Before sending the packet to a server, the traffic manager may perform NAT and/or PAT.

One of the reasons for doing this is as follows. A traffic manager needs a way of associating a response packet from a server with a particular client. When sending a packet on behalf of a client to a server, if a traffic manager assigns a different source port number for each connection from a client, the traffic manager has a way of knowing to which client a response packet from a server should be sent.

The following example may help to illustrate this concept. Assume that a traffic manager receives a packet from a client having an IP address and port number of 123.233.221.23: 5050. Assume that the packet should be sent to a server at an internal IP address and port number of 192.168.1.2:4040. Further, assume that on an internal network the traffic manager has an IP address of 192.168.1.1. Before sending the packet to a server, the traffic manager may translate the source IP address of the packet to be the traffic manager's source IP address, i.e. 192.168.1.1. In addition, the traffic manager may translate the source port address to a selected port number on the traffic manager such as 1025. The traffic manager may also translate the destination address to be that of the server, e.g. 192.168.1.2:4040. When the server receives the packet, from the server's perspective, the packet appears to have come from 192.168.1.1:1025, i.e., an IP address and port number associated with the traffic manager. When the server prepares to respond to the packet, the server will typically respond to the source IP address and port number included in the packet, in this case 192.168.1.1:1025.

When the traffic manager receives the response packet, the traffic manager may inspect the destination address and port number of the packet that it receives. In this case, the destination IP address and port number is 192.168.1.1:1025. The traffic manager may maintain a data structure that identifies which client address and port number are associated with 192.168.1.1:1025. (This may be included in the connection object described above in conjunction with FIG. 4.) In this case, this client address and port number is 123.233.221.23: 5050. The data structure may be indexed by client IP and port number, traffic manager internal IP and port number, or both. Thus, when the traffic manager receives a packet from a server, the traffic manager can perform a lookup in the table using the destination address, e.g. an assigned traffic manager IP address and port number, and find an associated client IP address and port number. The traffic manager can then perform NAT and/or PAT and send the packet to the appropriate client.

If a traffic manager has one IP address by which it is known to the servers (an internal IP address), the traffic manager may use the available ports (up to 65,000 in some protocols) to uniquely map to an equal number of connections from clients. For each additional internal IP address assigned to the traffic manager, the traffic manager may gain an additional number of ports to map to connections from clients.

For various reasons, a traffic manager may be assigned only one internal IP address. That is, to the servers to which the traffic manager is directing traffic and to other devices in an internal network, the traffic manager may be reachable through one IP address. In addition, a traffic manager may be restricted in the ports it may use. For example, in some operating systems and configurations, only 5000 ports might be available. In this scenario, a traffic manager may be able to support only 5000 unique connections from clients. When clients are requesting more than 5000 unique connections, the 5000 ports available to a traffic manager may not be enough to uniquely map each client connection. Even if a traffic manager is given more than one internal IP address and can use more than 5000 ports, a sufficient number of clients may request connections to consume the available unique mappings available to the traffic manager. Thus, a method and system for enabling a traffic manager to use each port for multiple client connections would be useful.

Method for Using a Port for Multiple Client Connections

Figure 8:
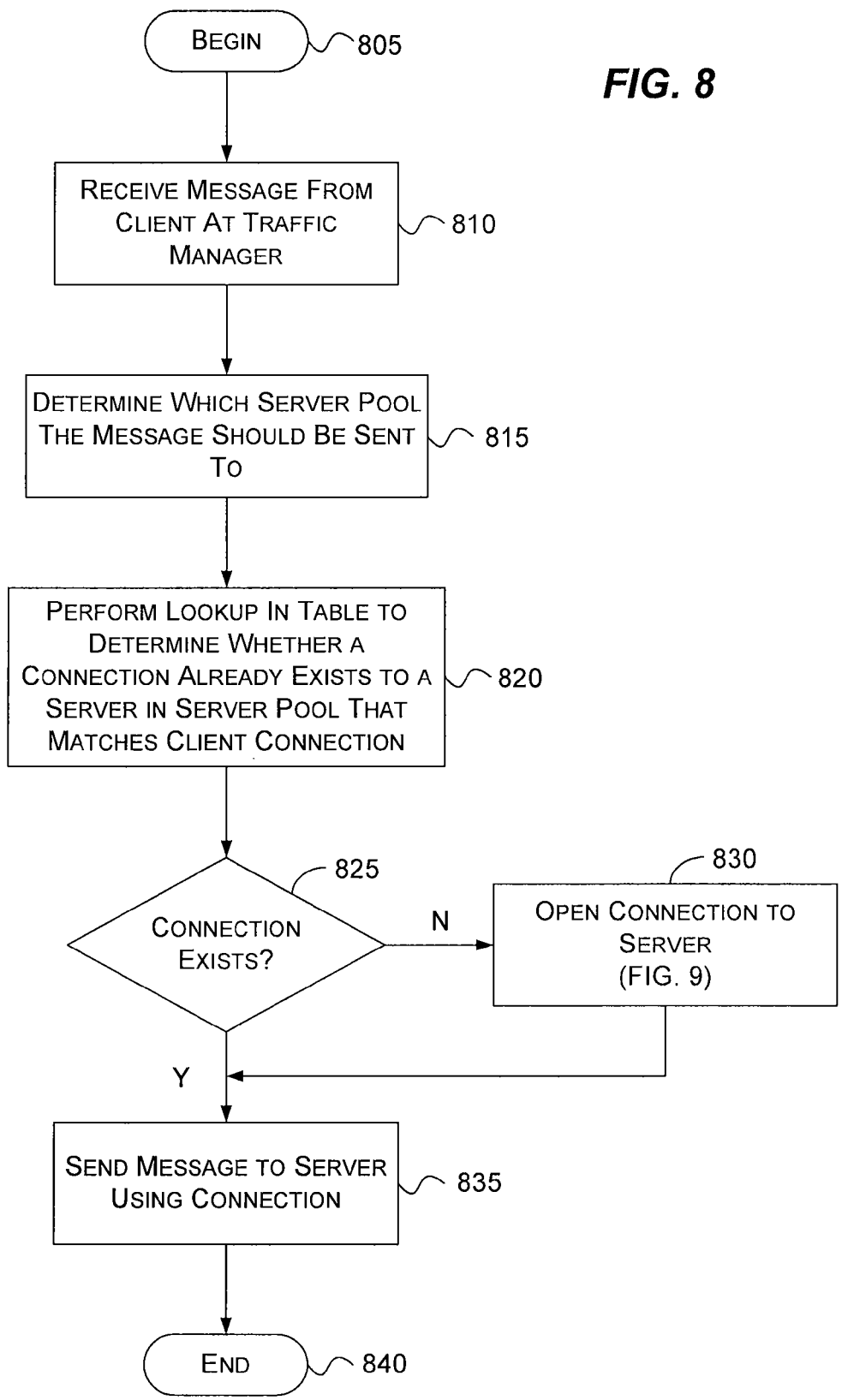
FIGS. 8-10 illustrate flowcharts for enabling a traffic manager to use a port to communicate with one or more servers on behalf of multiple client connections.
Figure 9:
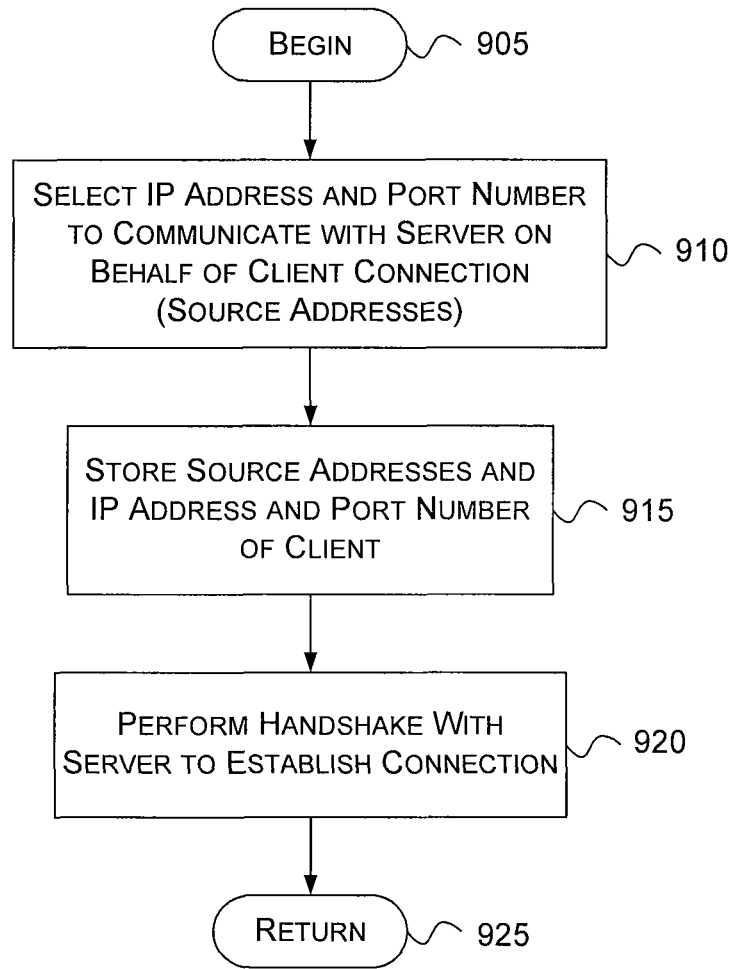
Figure 10:
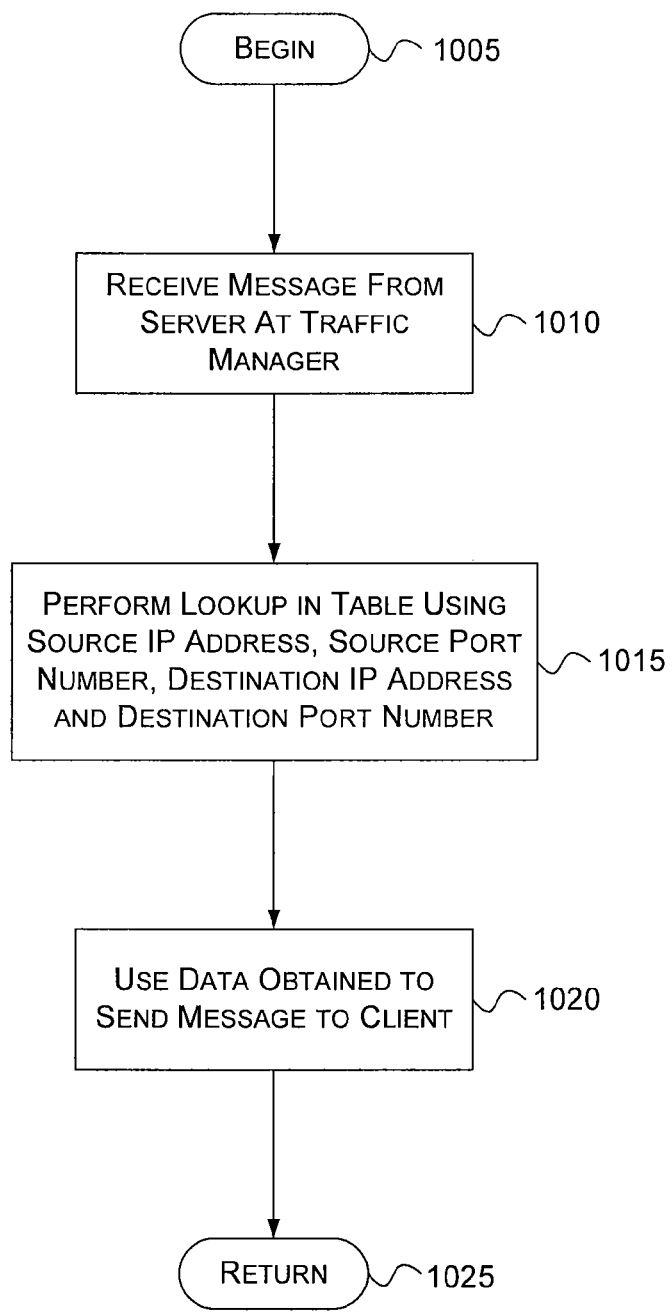

FIGS. 8-10 illustrate flowcharts for enabling a traffic manager to use a port to communicate with one or more servers on behalf of multiple client connections. The process illustrated in FIG. 8 begins at block 805 when a traffic manager is ready to receive a message from a client. After block 805, processing continues at block 810.

At block 810, a message from a client is received at a traffic manager. For example, referring to FIG. 7, traffic manager 415 receives a message from client 410. The message may be, for example, a request to establish a connection or a request for a service or file, such as GIF file, provided by servers connected to the traffic manager, such as servers in server pool 710. After block 810, processing continues at block 815.

At block 815, a determination is made as to which server pool the message should be sent. In some cases, the message should not be forwarded to any server. For example, the message may be a connection request or a message directed to the traffic manager itself as opposed to a device to which the traffic manager sends messages. In these cases, after performing appropriate processing based on the message, processing continues at block 805. In other cases, the message is to be forwarded to a server in a server pool to which the traffic manager provides access. As described earlier, the traffic manager may use a load balancing algorithm or some other algorithm for determining to which server to send the message.

For example, referring to FIG. 7, traffic manager 415 may receive a request from client 410 in which the request has a source IP address and port number of 123.233.221.23:5050. Client 410 may send a request for a GIF file. GIF files may be found in servers in server pool 710. Using this information, traffic manager 415 may determine that the request from client 410 should be sent to a server in server pool 710. After block 815 processing continues at block 820.

At block 820, a lookup is performed to determine whether a connection that matches the connection from the client already exists to a server in the determined server pool. A connection to a server may be matched to client connections in a variety of ways. For example, in some settings, a connection to a server may match only one connection from a single client. In this scenario, if another client makes a request that a traffic manager determines should go to the server, the traffic manager may not use an existing connection that matches only one connection from the single client. Even if the same client opens another connection to the server, under this scenario, the traffic manager may not use the existing connection because it matches the previous connection from the client.

In other settings, a connection to a server matches any number of connections from a single client. In this scenario, if another client makes a request that a traffic manager determines should go to the server, the traffic manager may not use the connection that matches connections from the single client for the other client. If the single client, however, opens a new connection to the traffic manager, the traffic manager may use an existing connection to the server that matches another connection to the client to send the request to the server for the new connection.

In other settings, a connection to a server matches a set of connections from a set of clients. In this scenario, if a client in the set of clients makes a request that a traffic manager determines should go to the server, the traffic manager can use an existing connection (if available) associated with the set of clients to transmit the request to the server. If a single client that already has a connection to a traffic manager opens a new connection and makes another request through its new connection, the traffic manager may be able to use the existing connection associated with the set of clients, if the existing connection matches one of the connections in the set of connections. For example, an existing connection may match connections from two specific ports of a client while not matching connections from other ports of the client. Also, for example, an existing connection may match any number of connections from a client.

Combinations of the above are also allowed. For example, some connections to some servers may match single clients, while other connections to servers may match connections from more than one client. Some connections to servers may match connections from any client.

When a connection from a client matches an existing connection to a server may be configured by a network administrator, user, and/or hardwired without departing from the spirit or scope of this invention. For example, a network administrator may configure a traffic manager such that connections from a set of clients with a certain range of IP addresses can each use the same connections to one or more servers.

A match may be determined by looking at any of the addresses of a connection, e.g. a source IP address, a source port number, a destination address, and a destination port number.

A client may have more than one connection to a traffic manager. Each connection, however, typically includes a source IP address and a source port number. A determination of whether a connection already exists to server in a server pool on behalf of the requesting client may include examining not only a client's IP address as contained in the message (typically the source IP address) but also the source port number as contained in the message. Examining both of these pieces of information may be useful in determining whether the traffic manager has a connection to a server on behalf of this connection from a client.

For example, referring to FIG. 7, traffic manager 415 receives a message from client 410. The message includes a source IP address and a source port number of 123.233.221.23:5050. In this example, traffic manager 415 has a connection to server 725 in server pool 710 on behalf of this connection from client 410. For this example, server 725 has an IP address of 192.168.1.2. Upon lookup, traffic manager 415 determines that it has a connection to server 725 on behalf of client 410. Traffic manager 415 may use a table similar to that shown in FIG. 11 to make this determination. For example, traffic manager 415 may scan the second column of the table for a connection from a client to determine which servers have been mapped to requests from this client.

Traffic manager 415 may then determine if any of these servers are in server pool 710. If any are, traffic manager 415 may determine that a connection exists to a server in the determined server pool on behalf of the client. After block 820, processing continues at block 825.

At block 825, if a connection exists as determined in block 820, processing continues at block 835; otherwise, processing continues at block 830. It should be noted that in some cases, a traffic manager may open a connection to another server in the determined server pool even if a connection already exists on behalf of the client to a server in the server pool. This may be done, for example, to load balance requests. For example, referring to FIG. 7, traffic manager 415 may determine that a connection already exists on behalf of a connection from client 410 having source IP address and source port number 123.233.221.23:5050. If so, processing would usually continue at block 835.

At block 830, a connection to the server is established as described in more detail in conjunction with FIG. 9. Briefly, an internal IP address and port number (hereinafter "source addresses") to use in communicating with the server are selected. The selected source addresses are stored and associated with the connection from the client. In addition, a handshake may be performed with the server to establish a connection. For example, referring to FIG. 7, assuming that server 710 is the selected pool and server 725 is the selected server, traffic manager 415 selects a source IP address and port number to open a connection with server 725. The source IP address and port number might be, for example, 192.168.1.1:1025. Traffic manager 415 stores this information and associates it with the client request and establishes a connection with server 725. After block 830, processing continues at block 835.

At block 835, a message is sent to the server using the connection. For example, referring to FIG. 7, traffic manager 415 sends a message on behalf of client 410 to server 725 using a connection with a source IP address and port number of 192.168.1.1:1025. It will be recognized that the connection may have been recently established or may have been found in a lookup and reused.

At block 840, the processing ends. At this point, a message has been received and a determination made as to which server pool the message should be directed. Then, a lookup was performed to determine whether a connection already existed to the server in this server pool on behalf of the client. If the connection existed, the connection may have been reused to send a message to the server on behalf of the client; otherwise, a connection may have been opened to the server and a message sent to the server over the opened connection. The process above may be repeated for each message received from a client at a traffic manager.

FIG. 9 illustrates a flowchart for opening a connection with a server, according to one embodiment of the invention. The process begins at block 905 when a connection needs to be selected. After block 905, processing continues at block 910.

At block 910, an IP address and port number (hereinafter "source addresses") are selected to communicate with a server on behalf of a client. The traffic manager may use these source addresses as the IP source address and port number for each packet the traffic manager sends to the server on behalf of the client. Selecting the source addresses may be done in many ways. For example, an idle connection may be selected and used to communicate with the server. The idle connection typically has a source IP address and port number that the traffic manager can use as the source addresses. The idle connection may need to be restored to activity by allocating buffers and performing other activities.

Alternatively, a traffic manager may select the client's IP address and port number as the source addresses. In this case, the traffic manager may inspect packets on its interfaces to determine if they are directed to the client's IP address and port number. The traffic manager may then take such packets and forward them to the client. In forwarding such packets to the client, the traffic manager may perform NAT and/or PAT on the source address of such packets. For example, the traffic manager may place its external IP address (the one that a client on outside network sees) so that the client will respond to the traffic manager (instead of a server managed by the traffic manager). Alternatively, each server may insert a global IP address associated with the traffic manager into the source address in which case the traffic manager may not need to perform a NAT and/or PAT to cause the client to respond to the traffic manager.

Alternatively, to select an IP address and port number to communicate with a server, a traffic manager performing NAT and/or PAT may loop through its available internal IP addresses (if it has more than one) and port addresses. When the traffic manager finds an IP address/port address combination, it may then perform a lookup to determine whether this IP address/port address combination is already in use for a connection to server selected in FIG. 8. If the combination is in use, the traffic manager may continue selecting other combinations to use until it finds one available. After the traffic manager finds an available combination, it may translate the source addresses of the packet to the available combination. The found combination is what is known as the "source addresses." For example, referring to FIG. 7, traffic manager 415 may select an internal IP address associated with traffic manager 415, such as 192.168.1.1. Traffic manager 415 may then loop through port numbers and find that port 1025. Traffic manager 415 may then use source addresses, such as 192.168.1.1:1025, for each packet sent to communicate with the server selected in FIG. 8 on behalf of a client, such as client 410. After block 910, processing continues at block 915.

At block 915, the source addresses are stored in a computer storage medium. In addition, the IP address and port number of the requesting client may also be associated with the source addresses in the computer storage medium. The association enables the traffic manager to, among other things, associate a connection with a server to a connection with a client. For example, when the traffic manager receives a response packet from a server as described in more detail in conjunction with FIG. 10, the traffic manager may perform a lookup to determine to which client, e.g., client IP address and port number, the response packet should be sent. In addition, when the traffic manager receives a packet from a client that it determines should go to a server pool, the traffic manager may perform a lookup to determine if a connection to a server in the server pool on behalf of the client, e.g. client IP address and port number, is already in use. For example, referring to FIG. 7, traffic manager 415 may store the client connection's IP address and port number, e.g. 123.233.221.23:5050, together with the selected source addresses, e.g., 192.168.1.1: 1025, and the source address and IP number of the selected server, e.g. 192.168.1.2:4040. After block 915, processing continues at block 920.

It should be appreciated that by storing these pieces of data, a traffic manager is able to use one port to connect to multiple servers on behalf of clients with various source addresses. When on one of its IP address/port number combinations a traffic manager receives a packet from a server, the packet includes a source IP address and port number identifying the server from which the packet came. The packet also includes a destination IP address and port number, e.g. an IP address and port number associated with the traffic manager. These four addresses may be combined into a key and used to index a table that includes data that associates a client IP address and port number with the packet received by the traffic manager. A key provides a way to identify a particular piece of data. A key may provide a quick way for the data to be found, such as if the key is used to index into a table or database. Typically, a key references one and only one piece of data, although the data can include many elements. In this case, the data might include, for example, a connection object that includes, among other things, an identification of a connection to a client.

One way of forming the key would be to simply concatenate the four addresses. It should be understood that any way of combining the addresses to form a key could be practiced without departing from the spirit or scope of the invention. Thus, for traffic sent from multiple servers to the same IP address and port number on a traffic manager, a traffic manager may determine to which client the packet should be sent by examining which server IP address and port number the packet came from together with the IP address and port number to which the packet is directed. These two sets of values may be combined into a key and then used to retrieve data that identifies a client connection.

When a traffic manager performing NAT and/or PAT translates an address, this may cause some problems in server log files. That is, an HTTP server, for example, may log the source addresses of requests it receives for various reasons. Logging an address for a request that has been translated either by NAT and/or PAT, however, loses information about the original client that sent the request. Thus, in one embodiment of the invention, a traffic manager performing address translation may insert information identifying the client into an HTTP header. For example, a traffic manager could insert the source addresses associated with the connection to the client. The HTTP server receiving the request may then retrieve this information and place it in a log file.

At block 920, a connection is established with the server using the selected source addresses. In some embodiments of the invention, an idle connection is restored to activity to communicate with the server. In other embodiments of the invention, a connection is established through handshaking and data regarding the connection is stored on the traffic manager. After block 920, processing continues at block 925.

At block 925, processing returns to a calling process. At this point, an IP address and port number have been selected to communicate with a server on behalf of a client connection. Source addresses, destination addresses, and a client's IP address and port number have been stored in a computer storage medium. Handshaking has been performed to establish a connection or an idle connection has been made active. This process may be called each time a connection with a server needs to be established or activated.

FIG. 10 illustrates a flowchart for forwarding a packet sent by a server to a traffic manager through an appropriate client connection, according to one embodiment of the invention. The process starts at block 1005 when a traffic manager is ready to receive a message from a server. After block 1005, processing continues at block 1010.

At block 1010, a message is received from a server. The message is received at the traffic manager. For example, referring to FIG. 7, traffic manager 415 receives a response packet from server 725. The packet may have a destination address associated with traffic manager 415, such as 192.168.1.1: 1025. The packet may also have a source address associated with server 725, such as 192.168.1.2:4040. After block 1010, processing continues at block 1015.

At block 1015, a lookup is performed using the source IP address, source port number, destination IP address, and destination port number. For example, referring to FIG. 7, traffic manager 415 causes a lookup to be performed on the source address of a connection on which the packet was received from the server, e.g. 192.168.1.2:4040, and the destination address of the connection, e.g. 192.168.1.1:1025, to retrieve a client address and port number, e.g. 123.233.221.23:5050, to which to send the response. The source address and destination address may be used to retrieve a connection object that includes or is associated with the address and port number of the client. After block 1015, processing continues at block 1020.

At block 1020, a packet is sent to a client based on the lookup performed in block 1015. For example, referring to FIG. 7, traffic manager 415 forwards the packet it receives from server 420 (after possible NAT and/or PAT) to client 410 on connection 123.233.221.23:5050. After block 1025, processing continues at block 1025.

At block 1025, processing returns to a calling process. The process shown in FIG. 10 may be repeated for each packet received from a server by a traffic manager.

FIG. 11 shows a mapping table that associates traffic manager internal IP addresses and port numbers with server IP addresses and port number, according to an embodiment of the invention. Each arrow (→) in the table means maps to or is associated with. The table also associates client IP addresses and port numbers with server IP addresses and port numbers. It will be recognized that this table could be used to associate a client connection with an internal IP addresses and port number, e.g., a NAT address, a traffic manager uses on behalf of a client connection. The table could also be used to associate a client connection with a server address or to associate a server connection with a client connection. For example, a traffic manager receiving a packet destined to NAT 1:1024 from server 1:80 could use the information to lookup to which client the packet should be forwarded. A packet received from server 2:80 on the same IP address and port number, i.e., NAT 1:1024, could be determined to be forwarded to client 2:8437. When a packet is received from a client, the mapping table could be used to determine whether a traffic manager already has a connection on behalf of the client to a server in a desired server pool. If the traffic manager already has a connection to the server, the table could be used to determine which NAT, e.g., NAT 1:1024, should be used to forward the packet. Information from the table could be used to locate a connection object. For example, a server IP address and port number and a NAT IP address and port number could uniquely reference a connection object. A client IP and port number might also be used for this purpose.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A traffic manager device for forwarding messages, comprising:
   a network interface unit for communicating with a least a client and a plurality of servers; and
   a processing unit for executing instructions that enable the traffic manager device to perform actions, including persistently mapping messages between a connection from the client and the plurality of servers to maintain a previous association for the client with a same server in the plurality of servers, wherein information regarding each persistent connection between the traffic manager device and a first server is stored and is retrievable using a single key that is generated from at least a source address that includes a port number in use with at least a second server on behalf of a second client when it is determined that the client and the second client are within a same set of clients as based on a range of addresses, and wherein the source address and the port number are concatenated with at least a destination address to generate the single key such that the concatenated information is employed as an index to a database of connection objects for subsequent comparison with other information associated with a single connection between the traffic manager device and the client, and wherein source addresses in single keys for each of at least two persistent connections include a same source port number such that a received response from the first server is one of a plurality of responses sent to the same port number from at least the first server and the second server.

2. The traffic manager device of claim 1, wherein the messages between the client and at least one of the servers in the plurality of servers employs a hypertext transport protocol (HTTP).

3. The traffic manager device of claim 1, wherein the processing unit is further configured to insert into at least part of a message to be forwarded to one of the servers a hypertext transport protocol (HTTP) header that includes an identification of the client.

4. The traffic manager device of claim 1, wherein at least one message from the client is partitioned into multiple messages by the traffic manager device and distributed across at least two of the servers within the plurality of servers.

5. The traffic manager device of claim 1, wherein the processing unit is configured to perform actions, further including:
   when a persistent mapping does not exist for the connection between the traffic manager device and the same server, then:
      selecting a source address and port number of the traffic manager device to communicate with one of the servers in the plurality of servers;
      opening a new connection with one of the servers using the source address and port number of the traffic manager device; and
      generating the single key; and
      storing the single key for use as an index for mapping a response received from the server on the new connection to the client.

6. The traffic manager device of claim 5, wherein generating the single key further comprises employing the IP address and port number at which the traffic manager is accessible by the server.

7. A system for managing messages from a client, comprising:
a plurality of servers; and
a traffic manager device that is interposed between the client and the plurality of servers and is configured to perform actions, including:
receiving a message from the client on first connection;
selecting at least a portion of the message to be forwarded to one of the servers in the plurality of servers;
when stored information exists for a previously established connection from the traffic manager device to one of the servers that matches other information regarding the first connection, forwarding the selected portion of the message to the server employing the existing previously established connection, wherein the server received a previous message from the client forwarded by the traffic manager device; and
when stored information does not exist, then:
selecting a source address and port number of the traffic manager device to communicate with one of the servers in the plurality of servers, the port number being in use with at least a second server on behalf of a second client when it is determined that the client and the second client are within a same set of clients as based on a range of addresses;
opening a new connection using the source address and port number of the traffic manager and a destination address and port number associated with the one server; and
storing information associated with the source address and port number of the traffic manager device with other information regarding the first connection, wherein the source address and port number of the traffic manager device are concatenated into a single key used as an index to a dataset of connection objects for mapping a response received from the one server to the first connection.

8. The system of claim 7, wherein the traffic manager device is configured to perform actions, further including:
selecting another portion of the message to be forwarded to another one of the servers in the plurality of servers;
when stored information exists for another previously established connection from the traffic manager device to the other one of the servers that matches other information regarding the first connection, forwarding the selected other portion of the message to the other server employing the other previously established connection, such that another response from the other server enables the traffic manager device to employ the single key to manage the other response to the client using the first connection.

9. The system of claim 7, wherein the traffic manager device is configured to perform actions, further including: examining the selected portion of the message to select one of the servers.

10. The system of claim 7, wherein the message is encoded using hypertext transport protocol (HTTP).

11. The system of claim 7, wherein another portion of the message is selected and sent to another one of the servers, the other server being selected based on the content of the other portion of the message.

12. The system of claim 7, wherein opening the new connection further comprises activating an unused connection.

13. The system of claim 7, wherein the source address and port number of the traffic manager device are further concatenated with a source address and port number of the one server to generate the single key.

14. A non-transitory machine readable storage medium that is configured to store instructions and data that when installed on a machine enable the machine to perform actions, including:
receiving over a first connection between a client and a traffic manager, a message to be forwarded to at least one server in a plurality of servers, the message being sent using hypertext transport protocol (HTTP); and
persistently mapping the message over the first connection from the client and the plurality of servers to maintain a previous association for the client with a same server in the plurality of servers, wherein information regarding each persistent connection between the traffic manager and a server is stored and is retrievable using a single key that is generated from at least a source address and port number of the traffic manager, the port number being in use with at least a second server on behalf of a second client when it is determined that the client and the second client are within a same set of clients as based on a range of addresses, and that is concatenated with at least a destination address and port number such that the concatenation information is employed as an index to a database of connection objects for subsequent comparisons with other information associated with the first connection between the traffic manager and the client.

15. The non-transitory machine readable storage medium of claim 14, wherein the traffic manager is configured to insert into at least part of a message to be forwarded to one of the servers a hypertext transport protocol (HTTP) header that includes an identification of the client.

16. The non-transitory machine readable storage medium of claim 14, wherein content of one of the messages is examined and when the content indicates requests for more than one content type is included in one of the messages, partitioning the one message into distinct requests based on the content type requested, and selecting different servers from the plurality of servers based on the content type for sending the distinct requests.

17. The non-transitory machine readable storage medium of claim 14, wherein the source address and port number of the traffic manager and a destination address of the same server is stored in a table that associated the single key with the first connection.

18. The non-transitory machine readable storage medium of claim 14, wherein the machine is configured to perform actions, further including:
selecting servers for which to send different portions of the messages based on whether the messages include requests for more than one content type; and
associating each connection with the selected servers with the first connection.

19. The non-transitory machine readable storage medium of claim 14, wherein the persistent mapping further comprises existing connection that matches a set of connection from a set of clients.

20. The non-transitory machine readable storage medium of claim 14, wherein the single key further comprises an identification of the client.

* * * * *